United States Patent [19]
Duggan et al.

[11] Patent Number: 5,881,289
[45] Date of Patent: Mar. 9, 1999

[54] REMOTE COMPILING OF SOURCE CODE FOR CROSS DEVELOPMENT

[75] Inventors: Gerald P. Duggan; David J. Staudacher, both of Fort Collins, Colo.

[73] Assignee: Hewlett-Packard Company, Palo Alto, Calif.

[21] Appl. No.: 757,034

[22] Filed: Nov. 26, 1996

[51] Int. Cl.$^6$ .............................. G06F 9/00; G06F 11/00
[52] U.S. Cl. ..................... 395/705; 395/706; 395/707; 395/183.14; 395/185.1
[58] Field of Search ................................ 395/705, 704, 395/707, 183.01, 183.14, 183.18, 185.1, 710

[56] References Cited

U.S. PATENT DOCUMENTS

| | | | |
|---|---|---|---|
| 5,313,635 | 5/1994 | Ishizuka et al. | 395/700 |
| 5,339,419 | 8/1994 | Chan et al. | 395/707 |
| 5,339,428 | 8/1994 | Burmeister et al. | 395/707 |
| 5,339,431 | 8/1994 | Rupp et al. | 395/710 |
| 5,673,390 | 9/1997 | Mueller | 395/185.1 |
| 5,675,800 | 10/1997 | Fisher, Jr. et al. | 1/1 |
| 5,715,387 | 2/1998 | Barnstijn et al. | 395/183.14 |
| 5,724,590 | 3/1998 | Goettelmann et al. | 395/707 |

*Primary Examiner*—James P. Trammell
*Assistant Examiner*—Demetra R. Smith

[57] ABSTRACT

A system on a development computer system that sends commands over a network to a target computer system to cause the target computer system to compile code from the development computer system. Before sending compiler parameters to the target computer system, the system converts all the command line compiler parameters into a neutral parameter format and then into a format usable on the target computer system. Compile errors are converted into a neutral format and then into a format that is usable by the system on the development computer system. This allows a developer using the development computer system to perform the compile and receive error messages as if the compile were being performed on the development computer system. The system also converts the file names for the source file and any other desirable files to allow the target computer system to access the source files located on the development computer system over the network.

14 Claims, 4 Drawing Sheets

REMOTE COMPILING OF SOURCE CODE FOR CROSS DEVELOPMENT

FIELD OF THE INVENTION

This invention relates to computer systems and more particularly to compiling of source code within such computer systems. Even more particularly, the invention relates to remotely compiling source code on a target computer.

BACKGROUND OF THE INVENTION

Software is often developed using multiple types of computer systems. For example, large organizations have mainframe computers, workstation computers, departmental server computers, and personal computers being used by individuals within the organization. While this diversity allows tremendous flexibility to meet price and performance needs for various computing functions, it adds complexity to the application development process.

Many development organizations require a Unix™ system on an engineer's desk for software development, and a personal computer on the same desk for office automation tasks. This effectively doubles the cost per engineer to the organization. In addition, all of these computer systems must be supported, which further increases the amount of support training and system administration staff needed by the organization. It also increases the amount of developer training necessary for using multiple development environments, as well as for the new technology.

In prior art systems, when software needs to be developed for a particular target computer system, there were two options. The first option is to develop the software on the target computer system, using existing text editors, compilers, etc. for the target computer system. This works very well when code is being developed only for one target computer system. However, when code needs to be developed that will run on several different target computer systems, it requires that each of these computer systems be accessible to the developer. For most efficient use of the developer's time, each of the target computer systems must also be present on the developer's desk, which is expensive, and sometimes difficult to arrange.

One difficulty with developing on several different computer systems, is that the developer must learn the environment of each of the target computer systems. This is time consuming, and if a developer moves often between different environments, this can become very confusing. Furthermore, the source code for the project must also be moved to each environment and in some cases, this is difficult or impossible.

A second option available when developing code for a target computer system is to use a cross compiler, which is a compiler that executes on one type of computer system but creates executable programming code for a second type of computer system. This may be the only option where the target computer system is too small to have a self-contained editor and compiler. When the target computer system is itself a larger computer system, cross compilers are not often available, so this option is not feasible.

There is need in the art then for a system that will allow development of code on one computer system while targeting a second computer system or more than one computer system. There is further need in the art for such a system that sends the code to the target computer system to be compiled, thus avoiding the need for a cross compiler. A further need is for such a system that retains the user environment of the development computer system while developing code for more than one target computer system. The present invention meets these and other needs in the art.

SUMMARY OF THE INVENTION

It is an aspect of the present invention to compile source code or link object code being developed on a development computer system, remotely on a target computer system.

It is another aspect of the invention to translate compiler or linker parameters from the development computer system syntax to the target computer system syntax.

A further aspect of the invention is to translate error messages and return codes output by the target computer system compiler and linker into a format usable on the development computer system.

The above and other aspects of the invention are accomplished in a system that runs on a development computer system and sends commands over a network to a target computer system to cause the target computer system to compile code that was developed on the development computer system. The system replaces the compiler on the development computer system with a RUNSTUB that intercepts the command to compile or link the code on the development computer system. When the code is to be compiled or linked on a target computer system, the system converts all the command line compiler or linker parameters into a neutral parameter format, sends the converted command over the network to the target computer system, and then converts the command into a format usable on the target computer system.

If errors are generated during the compile or link, the system converts the error messages created by the compiler or linker on the target computer system into a neutral format and then into a format that is useable by the development computer system. Thus, a developer using the development computer system performs the compile or link and receives error messages as if the compile or link were being performed on the development computer system, when in fact, the actual compile or link was performed on the target computer system.

BRIEF DESCRIPTION OF THE DRAWINGS

The above and other objects, features, and advantages of the invention will be better understood by reading the following more particular description of the invention, presented in conjunction with the following drawings wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
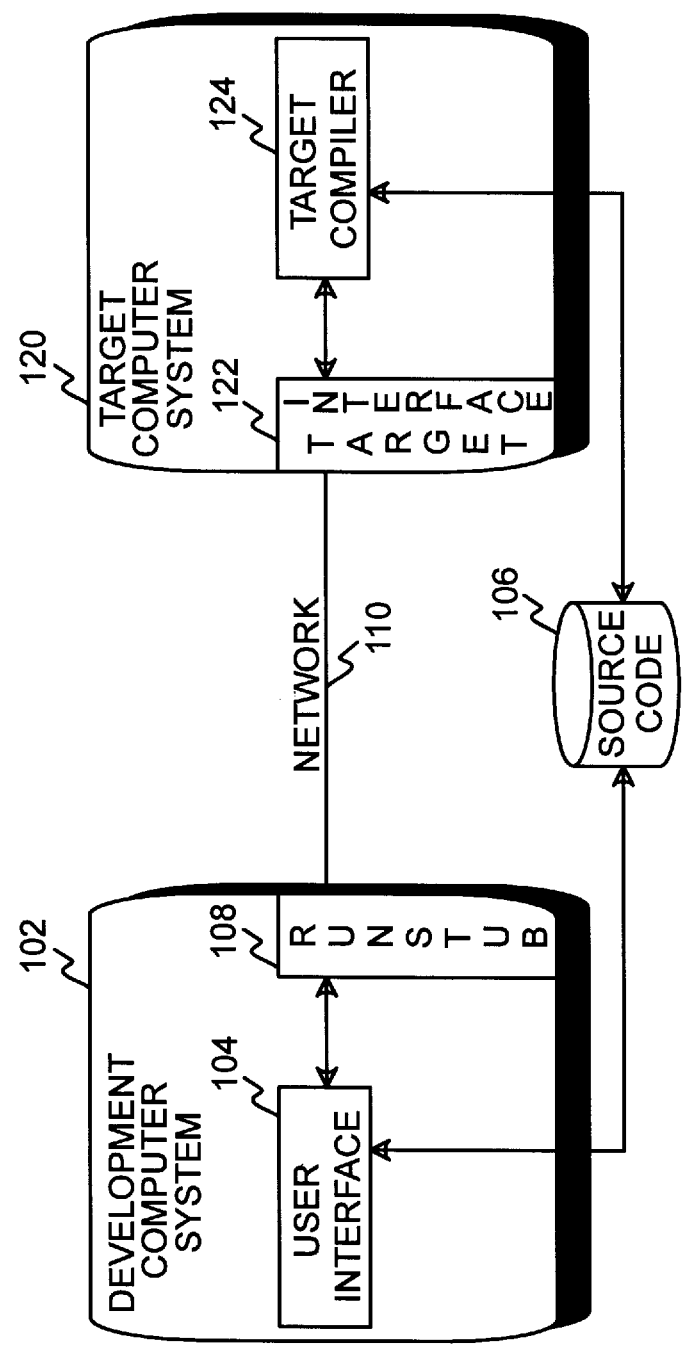
FIG. 1 shows a block diagram of the development and target computer systems and their connections.

FIG. 1 shows a block diagram of the development and target computer system of the present invention. Referring now to FIG. 1, a development computer system 102 contains a user interface 104 which is the software of the development environment. For example, within the user interface 104 would typically include a text editor, compiler, linker, etc., or what is commonly called an integrated development environment.

Microsoft's Visual C++ integrated development environment is one example of an integrated development environment that works with the present invention. Microsoft Visual C++ uses a Developer Studio as a component that manages collections of files and compiler settings. When the Developer Studio starts up, it starts up on a work space which consists of a collection of projects. A project consists of a single set of files and a set of one or more project configurations. Users can easily add or remove files from a project using the graphical user interface (GUI) features of the developer studio. A configuration specifies the settings of the compiler, linker and debugger which determine the final output for a project build. These settings include the optimization or debug level for the compiler, libraries to be searched by the linker, start up options for the program when it is debugged, and many other settings. The user must specify a single configuration for any particular build of a project. Changing a configuration is a simple matter of selecting a new configuration from a pull down list of available configurations. Creating a new configuration is similarly easy. Within a configuration, a user can specify the target computer system upon which the compile is to occur.

Using the user interface 104, a developer creates a source code file stored on a disk 106, which is shared with a target computer system 120. When the user indicates to the user interface that a compile or link should occur, the user interface invokes the compiler or linker program contained within the development computer system. In the present invention, however, the compiler and linker have been renamed to new names and a RUNSTUB 108 has been named the same as the original compiler/linker name to intercept the compile and link commands. Therefore, when the user interface 104 attempts to invoke the compiler or linker, the development computer system invokes the RUN-STUB 108 instead. The RUNSTUB 108 examines the configuration, and if the code is to be compiled or linked on a target computer system, the RUNSTUB 108 communicates over a network 110 to a target interface 122 within the target computer system 120. The communication over the network 110 causes the target interface 122 to invoke a target compiler or linker 124 within the target computer system to compile the source, or link objects, identified within the user interface 104 of the development computer system 102.

Before invoking the target compiler, the RUNSTUB 108 translates all parameters from the format of the development computer system, into a neutral format and sends the neutral format parameters over the network where the target interface 122 converts them from the neutral format into a format that is usable on the target computer system 120. Those skilled in the art will recognize, however, that either the RUNSTUB 108 or the target interface 122 could perform all the translation from the development system format into the target system format.

In addition, the RUNSTUB 108 translates file names so that the target compiler 124 can access the source code on the disk 106 over the network 110.

As the target compiler 124 compiles the source code, it may generate error messages and return codes, and those will be transmitted through the network 110. The target interface 122 translates the return codes and error messages into a neutral format and the RUNSTUB 108 translates the neutral format error messages into a format that is usable by the user interface 104. In this manner, the compile appears as if it had been compiled on the development computer system, which is the most convenient form for a user of the development computer system.

Figure 2:
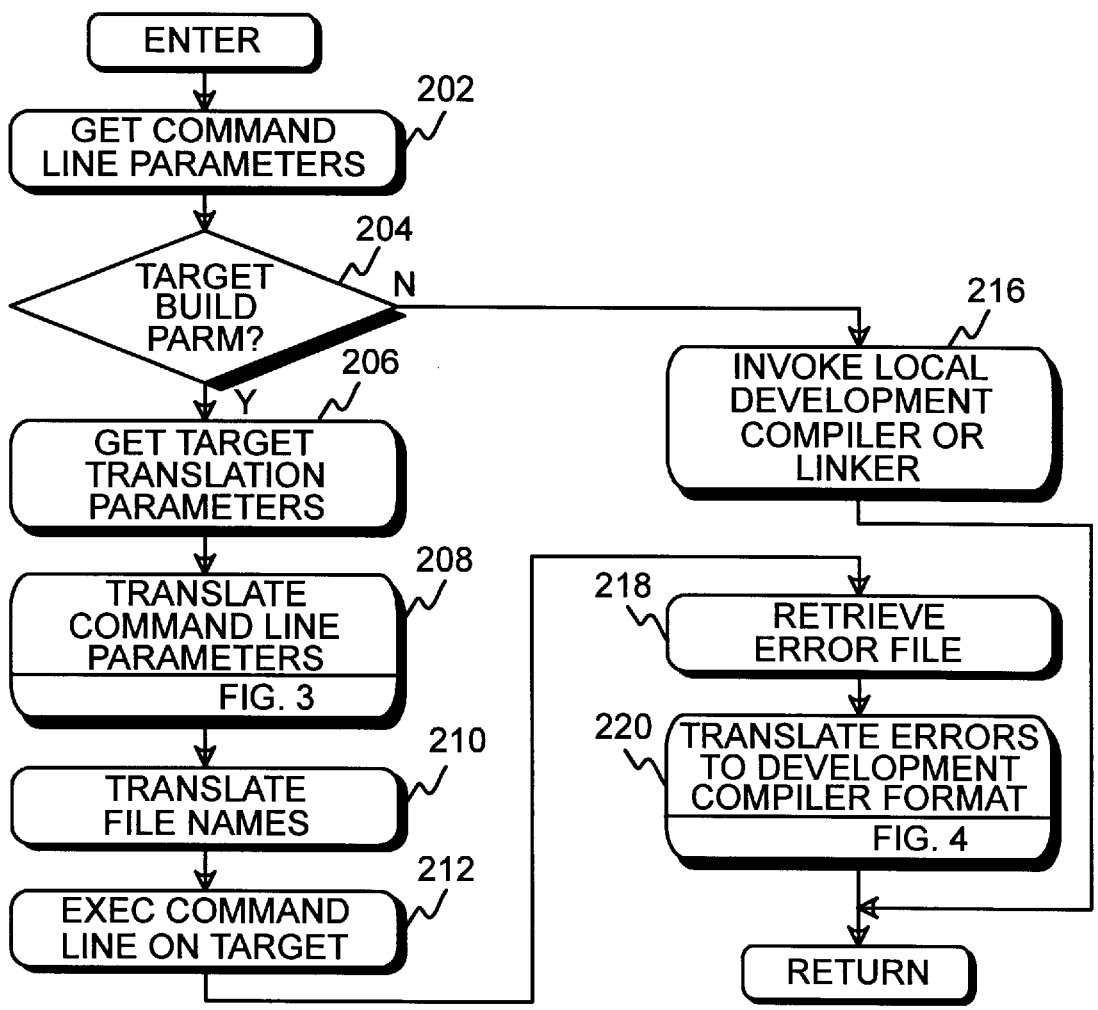
FIG. 2 shows a flowchart of the runstub software within the development computer system.

FIG. 2 shows a flowchart of the RUNSTUB software 108. Referring now to FIG. 2, after entry, block 202 gets the command line parameters that were passed from the user interface 104 (FIG. 1). Block 204 then determines whether the command line parameters include a parameter indicating where the target build should occur and if the target build should occur on the local computer system, block 204 transfers to block 216 which invokes the local development compiler or linker as required by the command line parameters.

Figure 3:
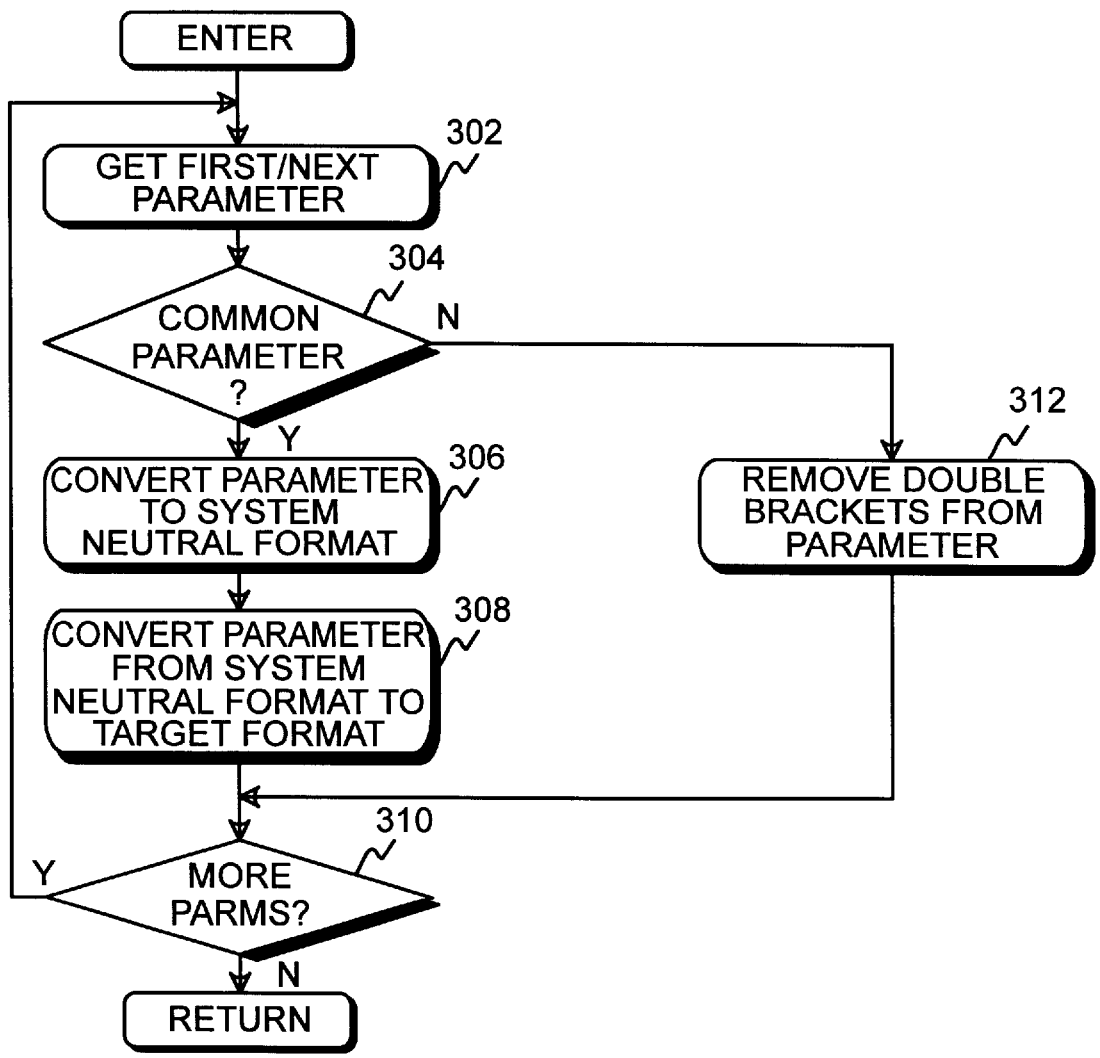
FIG. 3 shows a flowchart of the process of converting parameters.

When the build is to occur on the target computer system, block 204 goes to block 206 which gets the target translation parameters table from the disk 106 (FIG. 1) and then block 208 calls FIG. 3 to translate the command line parameters into parameters usable by the target computer system. After the command line parameters are translated, block 210 translates the file name so the target computer system can access the source, and any other files such as include or header files, directly from the development computer system. Block 212 then sends the command line to the target computer system to start the compile.

As the target computer system compiles the source code, control goes to block 218 which retrieves the errors that are created by the target compiler 124 (FIG. 1). Block 220 then calls FIG. 4 to translate any errors or return codes that were created by the target system into a format usable by the development environment, so that they can be displayed through the user interface 104.

FIG. 3 shows a flowchart of the process for translating command line parameters called from block 208 of FIG. 2. Referring now to FIG. 3, after entry, block 302 gets the first or next command line parameter and block 304 determines whether it is a common command line parameter. Common command line parameters are those that are available in both the development computer system and the target computer system, and thus need to be translated from the development computer system format into the target computer system format.

The present invention, however, allows a user to set command line parameters that are available only on a particular target computer system. Since these parameters are created specifically for the target computer system, they do no need to be translated. In the present invention, and by way of example only, these types of parameters are set aside by enclosing them within double brackets. Thus, the common parameters are determined by whether or not they are surrounded by double brackets.

If the parameter is surrounded by double brackets, it is not a common parameter, so block 304 goes to block 312 which removes the double brackets from the parameter and sends it directly to the output.

If the parameter is a common parameter, block 304 goes to block 306 which converts the parameter to a system neutral format. For example, if the development system compiler is Microsoft Visual C++, the command line option to generate normal debugging information is "/Zi". The equivalent option for a target computer system running HP-UX C++ compiler is "-g". The present invention converts the "/Zi" debug option into the word "debug" as a neutral format, and then converts the "debug" neutral format parameter into a "-g" if the target is HP-UX C++. If, on the other hand, the target is to be an ANSI C++ compiler, then the debug option is "-g0". In this case, the present invention would convert the "debug" neutral parameter into the "g0" parameter for use by the ANSI C++ compiler.

Because the present invention can work with any number of development computer system user interfaces, as well as any number of different target computer system compilers, using the neutral format considerably reduces the amount of code involved in translating the parameters. For example, for m different development computer system, and n different target computer systems, without using the neutral format the system would require m×n different sets of translation code. By using the neutral system format, the present invention changes this to m+n, thus considerably reducing the amount of code.

After converting the parameter to the neutral system format, block 308 then converts the neutral system format to the particular target computer system format. After converting the parameter, or if the parameter was not a common parameter, control goes to block 310 which determines whether there are more parameters to be converted, and if there are, block 310 returns to block 302 to convert the next parameter. After all parameters have been converted, block 310 returns to FIG. 2.

Figure 4:
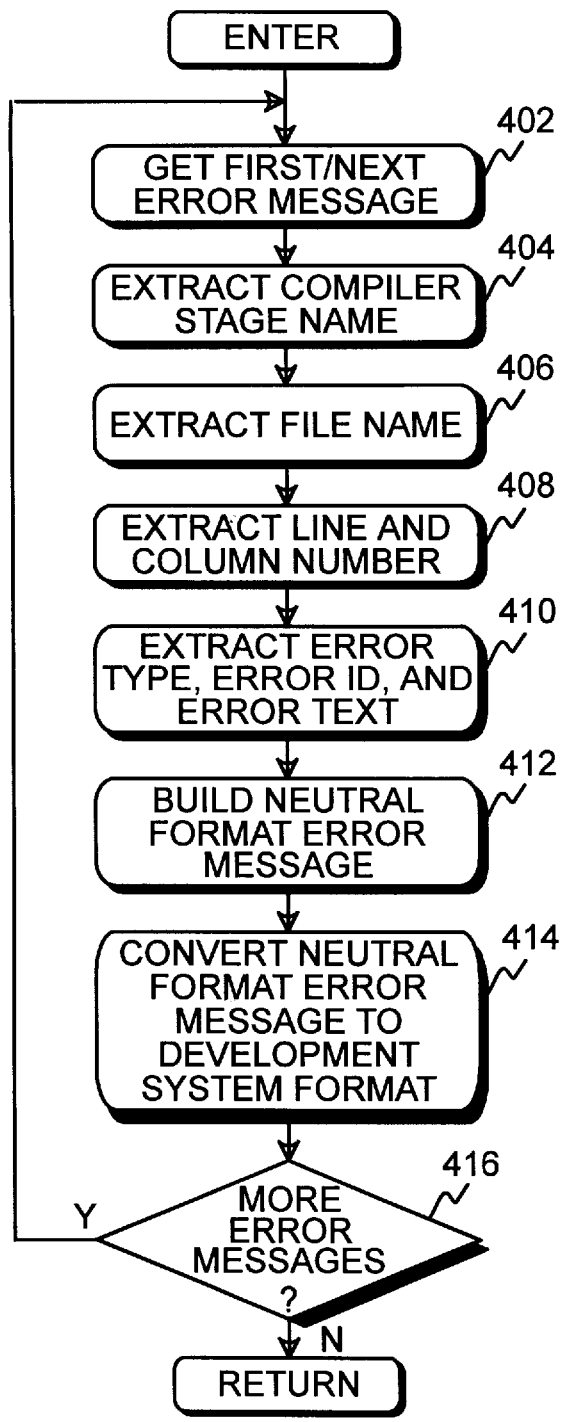
FIG. 4 shows a flowchart of the process of converting error messages.

FIG. 4 shows the flowchart of the translate errors routine called by block 220 of FIG. 2. Referring now to FIG. 4, after entry, block 402 gets the first or next error message to be converted. Block 404 then extracts the compiler stage name from the error message, that is, the name of the particular compiler stage that generated the error. For example, the error could have been generated by a compiler or a linker or a pre-processor. After extracting the compiler stage name, block 406 then extracts the file name of the source file that caused the error and block 408 extracts the line and column number within the file where the error occurred. Block 410 then extracts the error type, the error Id, for example, an internal tag that the compiler uses to identify the particular type of error, and block 410 also extracts the text of the error to be passed back to the user. Block 412 then builds a neutral format error message from the data extracted, in the same manner that the neutral format is used to convert command line parameters described above. Block 414 then converts the neutral format error message into the format acceptable on the development computer system. Block 416 then determines whether there are more error messages to be converted, and if so, returns to block 402 to process the next error message. After all error messages have been processed, block 416 returns to FIG. 2.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for compiling code on a target computer system, said code having been developed on a development computer system, said method comprising the steps of:

(a) intercepting a compile command on said development computer system;

(b) converting compile parameters to a format usable on said target computer system;

(c) sending a compile command to said target computer system to compile said code, wherein said compile command contains said parameters converted in step (b);

(d) converting any error messages produced on said target computer system to a format usable on said development computer system; and (e) displaying results of said compile on said development computer system.

2. The method of claim 1 wherein step (b) further comprises the step of:

(b1) converting said compile parameters into a computer system neutral format; and (b2) converting said compile parameters from said computer system neutral format into said format usable on said target computer system.

3. The method of claim 1 wherein step (d) further comprises the step of:

(d1) converting said error messages into a computer system neutral format; and (d2) converting said error messages from said computer system neutral format into said format usable on said development computer system.

4. The method of claim 1 wherein step (c) further comprises the following step (c1):

(c1) when said compile command indicates that said compiling should be performed on said development computer system, invoking a compiler on said development computer system to compile said source code.

5. A system for compiling code on a target computer system, said code having been developed on a development computer system, said system comprising:

a translating system for intercepting a compile command on said development computer system and converting compile parameters to a format usable on said target computer system;

a computer system network for sending a compile command to said target computer system to compile said source code, wherein said compile command contains said parameters converted by said translating system;

means within said translating system for converting any error messages produced by performance of said compile command on said target computer system to a format usable on said development computer system; and a display system for displaying results of said compile on said development computer system.

6. The system of claim 5 wherein said converting within said translating system further comprises:

means for converting said compile parameters into a computer system neutral format; and means for converting said compile parameters from said computer system neutral format into said format usable on said target computer system.

7. The system of claim 5 wherein said translating system further comprises:

means for converting said error messages into a computer system neutral format; and means for converting said error messages from said computer system neutral format into said format usable on said development computer system.

8. A method for linking code on a target computer system, said code having been developed on a development computer system, said method comprising the steps of:

(a) intercepting a link command on said development computer system;

(b) converting link parameters to a format usable on said target computer system;

(c) sending a link command to said target computer system to link said code, wherein said link command contains said parameters converted in step (b);

(d) converting any error messages produced on said target computer system to a format usable on said development computer system; and (e) displaying results of said link on said development computer system.

9. The method of claim 8 wherein step (b) further comprises the step of:

(b1) converting said link parameters into a computer system neutral format; and (b2) converting said link parameters from said computer system neutral format into said format usable on said target computer system.

10. The method of claim 8 wherein step (d) further comprises the step of:

(d1) converting said error messages into a computer system neutral format; and (d2) converting said error messages from said computer system neutral format into said format usable on said development computer system.

11. The method of claim 8 wherein step (c) further comprises the following step (c1):

(c1) when said link command indicates that said compiling should be performed on said development computer system, invoking a linker on said development computer system to link said source code.

12. A system for linking code on a target computer system, said code having been developed on a development computer system, said system comprising:

a translating system for intercepting a link command on said development computer system and converting link parameters to a format usable on said target computer system;

a computer system network for sending a link command to said target computer system to link said source code, wherein said link command contains said parameters converted by said translating system;

means within said translating system for converting any error messages produced by performance of said link command on said target computer system to a format usable on said development computer system; and a display system for displaying results of said link on said development computer system.

13. The system of claim 12 wherein said converting within said translating system further comprises:

means for converting said link parameters into a computer system neutral format; and means for converting said link parameters from said computer system neutral format into said format usable on said target computer system.

14. The system of claim 12 wherein said translating system further comprises:

means for converting said error messages into a computer system neutral format; and means for converting said error messages from said computer system neutral format into said format usable on said development computer system.

* * * * *